United States Patent Office
2,841,589
Patented July 1, 1958

2,841,589
ALPHA-ARYL,ALPHA(2-PYRIDYL)BUTYRYL AMIDES AND PROCESS OF PREPARATION

Arne Elof Brandstrom, Nils Sixten Hjelte, and Olle Martensson, Uppsala, Sweden, assignors to Aktiebolaget Pharmacia, Uppsala, Sweden, a corporation of Sweden No Drawing. Application June 2, 1955
Serial No. 512,892

Claims priority, application Sweden June 4, 1954

15 Claims. (Cl. 260—294)

This invention relates to a new group of compounds and to processes for their manufacture. More particularly this invention relates to disubstituted amides of α-phenyl-α-(2-pyridyl)-γ-disubstituted-aminobutyric acid and their acid addition and quaternary salts, which may be represented by the following genenral formula:

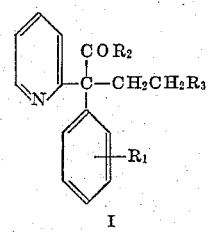

I wherein $R_1$ is a member of the group consisting of H, Cl, Br, lower alkyl and lower alkoxy, and $R_2$ and $R_3$ are members of the group consisting of dialkylamino, piperidino, morpholino and pyrrolidino groups.

It is well known that the propylamine-type antihistamines exhibit a high degree of therapeutical usefulness in the treatment of allergies. Particularly, 3-phenyl-3-(2'-pyridyl)-1-dimethylaminopropane, 3-(p-chlorophenyl)-3-(2'-pyridyl)-dimethylaminopropane, and 3-(p-bromophenyl)-3-(2'-pyridyl)--dimethylaminopropane, are typical examples of propylamine-type substances, which have found wide clinical application in the treatment of various allergic disorders. In addition to the foregoing, analogous compounds possessing a piperidino or pyrrolidino group, and the like, have been found to be potent antihistaminic substances.

The compounds of our invention, as represented by general Formula I, have been found to be useful intermediates in the preparation of the aforementioned propylamine-type antihistamines. They have exhibited pharmacological properties such as antihistaminic and antispasmodic activity.

Apart from possessing therapeutic utility per se, the amides I, by a new series of transformations, conveniently and economically, afford the hereinabovementioned known active antihistaminic substances.

We have further found that the amides of Formula I, may be hydrolyzed and decarboxylated without concomitant auto-condensation, in a facile and economical manner, affording good yields of known therapeutically active compounds. Thus, the compounds of this invention, by their very nature, provide a novel route by which these therapeutically active substances may be produced.

The compounds of our invention may be prepared according to the following equations showing alternate sequence of reactions:

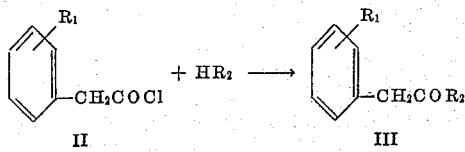

A $$\underset{IV}{\overset{}{\bigcirc}}_{N-Z} + III \longrightarrow \underset{V}{\overset{C_6H_4R_1}{\underset{COR_2}{\overset{}{\bigcirc}}_{N}-CH}} \xrightarrow{ZCH_2CH_2R_3} I$$

B $$ZCH_2CH_2R_3 + III \longrightarrow \underset{VII}{\overset{R_1}{\underset{COR_2}{\overset{}{\bigcirc}}-\underset{CH}{\overset{CH_2CH_2R_3}{|}}}} \xrightarrow{IV} I$$

The compounds represented by III may be transformed into the compounds of our invention (I), as indicated hereinabove. It is to be noted that the two apparently successive condensations may be performed with or without isolation of the intermediary products formed. It is further noted that we prefer to employ sodium amide, as the basic condensation agent, although other agents may be used with equal advantage, such as sodium hydride, lithium amide, potassium amide and lower alkyl Grignard reagents, such as ethyl magnesium bromide.

As is indicated, it is not necessary to isolate the intermediary products formed and, further, the condensations may be carried out in any sequence. As shown in the equations, the disubstituted amide (III), may be first condensed with a 2-pyridyl halide and the reaction product so obtained condensed with a disubstituted aminoethyl halide (Equation A). Alternatively, the disubstituted aminoethyl halide may be introduced first and the product so obtained further condensed with a 2-pyridyl halide (Equation B). We have also found that both the 2-pyridyl halide and the disubstituted aminoethyl halide may be added simultaneously to compounds of type III without materially affecting the quality or yield of the amides of Formula I.

The condensations are suitably carried out in the presence of an inert solvent and we prefer to employ solvents such as anhydrous toluene, benzene, ether, etc. or suitable mixture of these solvents.

The compounds of Formula I are conveniently transformed into the aforementioned propylamine-type antihistaminic substances by hydrolysis and decarboxylation. This transformation is advantageously performed in the presence of acids such as sulfuric, hydrochloric, trichloroacetic acids, or basic media such as aqueous and alcoholic alkali, sodium, potassium, and calcium hydroxides. Other known hydrolytic agents such as sodium amide in an inert solvent may also be used.

The compounds of this invention are preferably employed in the form of therapeutically acceptable acid addition and quaternary salts such as hydrochlorides, maleates, tartrates, citrates, methiodides, ethbromides, dimethylsulfates, etc. The acid addition salts are prepared generally by dissolving the basic amide I in a suitable solvent such as ethanol and adding an equivalent quantity of acid. Upon dilution with a second solvent such as ether, the acid addition salt precipitates. Alternatively, the basic amides may be dissolved in a non-polar solvent such as ether, and added to a solution of the acid in ether whereupon the salt so formed precipitates. The quaternary salts are conveniently prepared in benzene or ether by mixing equimolecular quantities of the basic amide I and the appropriate quaternizing agents, methyl bromide, methyl chloride, ethyl bromide, dimethylsulfate, etc. Both the acid addition and quaternary salts are purified by recrystallization from ethyl acetate, isopropyl acetate or mixtures of absolute alcohol ether.

The following examples of the compounds of the invention and of methods of making them and of transforming same into known therapeutically active substances, are illustrative of the principles of our invention.

All temperatures mentioned in the example are in centigrade degrees.

EXAMPLE 1

*α-(p-Chlorophenyl)-α-(2-pyridyl)-γ-dimethylamino-butyric acid dimethylamide*

The requisite intermediate, p-chlorophenylacetic acid dimethylamide, is prepared as follows: To a cooled and stirred solution of 600 g. of dimethylamine in 5 liters of anhydrous benzene is dropwise added 906 g. of p-chlorophenylacetyl chloride at such a rate so as to keep the reaction temperature below 20°. The mixture is allowed to stand overnight, whereupon 2 liters of water are dropwise added and the layers are separated. The benzene solution is dried and concentrated, whereupon the residue is distilled in vacuo, yielding 925 g. of the dimethylamide, B. P. 160–1803/4 mm.

The dimethylamide so obtained is transformed into the further intermediate, α-(p-chlorophenyl)-α-(2-pyridyl)-acetic acid dimethylamide, according to the following: To a solution of 0.5 mole of p-chlorophenylacetic acid dimethylamide in 500 ml. of anhydrous toluene is added 0.55 mole of sodium amide and the resultant mixture is refluxed for two hours. The mixture is cooled to below 85° whereupon 0.5 mole of 2-bromopyridine is dropwise added and the reaction mixture is refluxed for an additional four hours. After cooling, the mixture is poured into water and the toluene solution is separated, dried and concentrated to a residue. The residue is distilled affording the requisite intermediate, B. P. 190–195°/1–2 mm.

To a solution of 0.5 mole of α-(p-chlorophenyl)-α-(2-pyridyl)-acetic acid dimethylamide in 500 ml. of anhydrous benzene is added 0.55 mole of sodium amide and the mixture is refluxed for two hours. The reaction temperature is then lowered to 30° whereupon 0.5 mole of β-dimethylaminoethyl chloride is added and the reaction temperature is maintained at 30–35° for two additional hours at the end of which time the mixture is refluxed for seven hours. After cooling, the alkylation mixture is poured into water and the benzene layer is separated, dried and concentrated to a residue. The residue is distilled in vacuo affording the butyric acid dimethylamide of this example, B. P. 205–210°/1–2 mm.

Alternatively, the compound of this example may be prepared as follows: The requisite intermediate, α-(p-chlorophenyl)-γ-dimethylamine butyric acid dimethylamide, B. P. 150–152°/1–2 mm., is synthesized from 0.5 mole of p-chlorophenylacetic acid dimethylamide, 0.55 mole of sodium amide, 500 ml. of anhydrous benzene and 0.5 mole of β-dimethylaminoethyl chloride as analogously described above. The reaction product so obtained is further treated with sodium amide and 2-bromopyridine according to the method previously described, affording the compound of this example.

EXAMPLE 2

*α-Phenyl-α-(2-pyridyl)-γ-dimethylaminobutyric acid dimethylamide*

The requisite intermediate, α-phenyl-α-(2-pyridyl)-acetic acid dimethylamide, B. P. 185–190°/1–2 mm., is obtained in the same manner as described in Example 1, when using phenylacetic acid dimethylamide as starting material instead of p-chlorophenylacetic acid dimethylamide. Reaction of the so obtained intermediate with sodium amide and β-dimethylaminoethyl chloride as described in Example 1, affords the compound of this example, B. P. 200–205°/1–2 mm.

EXAMPLE 3

*α-(p-Chlorophenyl)-α-(2-pyridyl)-γ-dimethylamino-butyric acid diethylamide*

The requisite intermediate, p-chlorophenylacetic acid diethylamide is prepared in the same manner as in Example 1, using 920 g. of diethylamine in place of the dimethylamine.

The diethylamide so obtained is converted into the intermediate α - (p - chlorophenyl) - α - (2 - pyridyl)-acetic acid diethylamide, B. P. 183–188°/1–2 mm., according to the procedure described in Example 1. This intermediate is treated with sodium amide and β-dimethylaminoethyl chloride as described in example 1, affording the compound of this example, B. P. 205–210°/1–2 mm.

EXAMPLE 4

*N-[α-(p-bromophenyl)-α-(2-pyridyl)-γ-dimethyl-aminobutyryl]-piperidine*

The requisite intermediate, N-(p-bromophenylacetyl)-piperidine, is prepared from p-bromophenylacetyl chloride and piperidine, according to the analogous procedure of Example 1, B. P. 185–200°/3 mm.

The piperidide so obtained is transformed into the intermediate N - [α - (p - chlorophenyl) - α - (2 - pyridyl)-acetyl]-piperidine, B. P. 210–220°/1 mm., by reaction with 2-bromopyridine, according to the procedure described in Example 1. Alkylation of the latter intermediate with dimethylaminoethyl chloride, as previously described, affords the N-substituted piperidine of this example, B. P. 220–225°/1 mm.

EXAMPLE 5

*α-(p-Chlorophenyl)-α-(2-pyridyl)-γ-pyrrolidino-butyric acid dimethylamide*

From the reaction of α-(p-chlorophenyl)-α-(2-pyridyl) acetic acid dimethylamide, obtained in Example 1, with β-pyrrolidinoethyl chloride, according to the analogous procedure of Example 1, there is obtained the amide of this example, B. P. 210–215°/1 mm.

EXAMPLE 6

*α-Phenyl-α-(2-pyridyl)-γ-morpholinobutyric acid dimethylamide*

By substituting β-morpholinoethyl chloride for β-dimethylaminoethyl chloride, in Example 2, there is obtained the compound of this example, B. P. 220–225°/2 mm.

EXAMPLE 7

*α-(p-Bromophenyl)-α-(2-pyridyl)-γ-piperidinobutyric acid diethylamide*

The requisite intermediate, p-bromophenylacetic acid diethylamide is prepared from p-bromophenylacetyl chloride and diethylamine, according to the analogous procedure of Example 3, B. P. 180–185°/2 mm.

The diethylamide so obtained, is converted into the intermediate α - (p - bromophenyl) - α - (2 - pyridyl)-acetic acid diethylamide, B. P. 190–200°/1 mm., by reaction with 2-bromopyridine according to the procedure described in Example 1.

Alkylation of the so obtained intermediate with β-piperidinoethyl chloride as analogously described in Example 1, affords the compound of this example, B. P. 210–215°/1 mm.

EXAMPLE 8

*N-[α-(p-chlorophenyl)-α-(2-pyridyl)-γ-piperidino-butyryl]-pyrrolidine*

The requisite intermediate, N-(p-chlorophenylacetyl)-pyrrolidine is prepared from p-chlorophenylacetyl chloride and pyrrolidine according to the analogous procedure of Example 1, B. P. 175–185°/2 mm.

This intermediate is transformed into N-[α-(p-chlorophenyl)-α-(2-pyridyl)-acetyl]-pyrrolidine, B. P. 220–207°/1 mm., by reaction with 2-bromo-pyridine according to the procedure described in Example 1. Alkylation of this latter intermediate with β-piperidinoethyl chloride, as previously described, affords the compound of this example, B. P. 215–225°/1 mm.

EXAMPLE 9

α-(p-Methylphenyl)-α-(2-pyridyl)-γ-dimethylaminobutyric acid dimethylamide

The primary intermediate, p-methylphenyl acetic acid dimethylamide, B. P. 145–155°/3 mm., is prepared according to the analogous procedure of Example 1, using p-methylphenyl acetyl chloride.

Following the procedure of Example 1, the dimethylamide so obtained is transformed into α-(p-methylphenyl)-α-(2-pyridyl) acetic acid dimethylamide, B. P. 180–185°/1 mm., which in turn is converted into the compound of this example, B. P. 185–190°/1 mm.

Alternatively, the compound of this example may be prepared in the following manner. To a solution of 0.5 mole of p-methylphenylacetic acid dimethylamide, in 500 ml. of anhydrous toluene, is added 0.55 mm. of sodium amide and the resulting mixture is refluxed for 2 hours. The mixture is cooled to below 85°, whereupon a mixture of 0.5 mole of 2-chloropyridine and 0.5 mole of β-dimethylaminoethyl chloride is added and the resulting mixture is refluxed for an additional 4 hours. After cooling, the mixture is poured into water and the toluene solution is separated, dried and concentrated to a residue. The residue, upon distillation in vacuo affords the compound of this example.

EXAMPLE 10

α-(o-Chlorophenyl)-α-(2-pyridyl)-γ-dimethylaminobutyric acid dimethylamide

Using o-chlorophenylacetic acid as starting material, according to the procedure of Example 1, there is obtained α-(o-chlorophenyl)-α-(2-pyridyl)-acetic acid dimethylamide, B. P. 185–190°/1 mm. Further alkylation of this latter intermediate, with β-dimethylaminoethyl chloride, as previously described, affords the compound of this example, B. P. 205–210°/2 mm.

EXAMPLE 11

α-(m-Methoxyphenyl)-α-(2-pyridyl)-γ-dimethylaminobutyric acid dimethylamide

The compound of this example is obtained according to the procedure of Example 1, using m-methoxyphenylacetic acid as starting material, B. P. 210–220°/3 mm.

EXAMPLE 12

α(p-Methoxyphenyl)-α-(2-pyridyl)-γ-dimethylaminobutyric acid dimethylamide

By employing p-methoxyphenyl acetic acid as starting material and following the procedure of Example 1, the compound of this example is obtained, B. P. 208–214°/2 mm.

EXAMPLE 13

Hydrolysis and decarboxylation of the phenyl-(2-pyridyl)-butyric acid amides The following procedure is general for the hydrolysis and decarboxylation of the amides described in the foregoing examples: A mixture of 20 g. of α-(p-chlorophenyl)-α-(2-pyridyl)-γ-dimethylaminobutyric acid dimethylamide, obtained in Example 1, and 80 g. of 80% sulfuric acid, is heated in an oil bath at 145–155° for 42 hours. The reaction mixture is poured into ice-water, made alkaline, and extracted with benzene. The benzene solution is concentrated to a residue which is distilled in vacuo, affording the propylamine of this example, B. P. 150–152°/1.5 mm.

In similar fashion, the amides obtained in examples 2 through 12 may be transformed into the corresponding propylamine-type antihistamine:

| Product of Example No. | Propylamine | B. P. |
|---|---|---|
| 2 | 3-Phenyl-3-(2'-pyridyl)-N,N-dimethylpropylamine. | 140–142°/1.5 mm. |
| 3 | Same as Example 13 | |
| 4 | 3-p-Bromophenyl-3-(2'-pyridyl)-N,N-dimethylpropylamine. | 147–152°/0.5 mm. |
| 5 | 3-(p-Chlorophenyl)-3-(2-pyridyl)-N-pyrrolidino propane. | 170–175°/1 mm. |
| 6 | 3-Phenyl-3-(2-pyridyl)-N-morpholinopropane. | 195–199°/1 mm. |
| 7 | 3-p-Bromophenyl-(2-pyridyl)-N-piperidinopropane. | 185–190°/1 mm. |
| 8 | 3-(p-Chlorophenyl)-3-(2-pyridyl)-N-piperidinopropane. | 175–180°/1 mm. |
| 9 | 3-p-Methylphenyl-3-(2-pyridyl)-N,N-dimethylpropylamine. | 130–135°/0.5 mm. |
| 10 | 3-o-Chlorophenyl-3-(2-pyridyl)-N,N-dimethylpropylamine. | 142°/1 mm. |
| 11 | 3-m-Methoxyphenyl-3-(2-pyridyl)-N,N-dimethylpropylamine. | 150–153°/1 mm. |
| 12 | 3-p-Methoxyphenyl-3-(2-pyridyl)-N,N-dimethylpropylamine. | 137–142°/0.5 mm. |

Hydrolysis and decarboxylation of the basic amides (I) may also be carried out using hydrolytic agents. Hydrolysis is preferably performed in a mixture of solvents, the following procedure illustrating a typical basic hydrolysis:

To a mixture of 60 cc. of toluene and 5 cc. of butanol there is added 32.5 g. of potassium hydroxide. To this mixture, at reflux temperature, there is added 50 g. of the basic amide of Example 1 and refluxing is continued for 10 to 15 hours. The reaction mixture is then cooled, treated with water and the aqueous phase discarded. The toluene layer is washed free of alkali, the toluene dried and then removed in vacuo. The resulting propylamine, 3(p-chlorophenyl)-3-(2-pyridyl)-N,N-dimethylpropylamine, is purified by vacuo distillation.

In place of potassium hydroxide, sodium hydroxide can be employed using the toluene butanol solvent system. Alternatively, sodium amide may be substituted for the potassium hydroxide, the hydrolysis in this instance being carried out in anhydrous toluene on mixes of toluene and benzene.

EXAMPLE 14

Acid addition salts of amides I

The acid addition salts of the compound of Examples 1 through 12 are prepared in a conventional manner of mixing equivalent amounts of the basic amide and the acid. For example, the hydrochloride of the first example is obtained as a white crystalline solid by mixing one equivalent of the amide and one equivalent of hydrogen chloride in anhydrous ether. The hydrochloride so obtained is recrystallized from absolute ethanolether mixtures. The maleate, citrate, etc. are similarly prepared.

EXAMPLE 15

Quaternary salts of amides I

The basic amides of Examples 1 through 12 in anhydrous benzene or ether solution yield on treatment with methyl bromide, ethyl chloride, dimethylsulfate, etc., white crystalline quaternary salts which may be purified for recrystallization from absolute alcohol and alcohol ether mixtures. By this general procedure, there is obtained the methobromide of α-(p-chlorophenyl)-α-2-pyridyl)-γ-dimethylaminobutyric acid dimethylamide, the ethobromide of α-phenyl-α-(2-pyridyl)-γ-dimethylaminobutyric acid dimethylamide, the methochloride of N-[α-(p-chlorophenyl)-α-(2-pyridyl)-γ-piperidinobutyryl]-pyrrolidine, etc.

We claim:
1. Compounds consisting of the free bases of the fol- lowing formula and the non-toxic acid addition and lower alkyl quaternary salts:

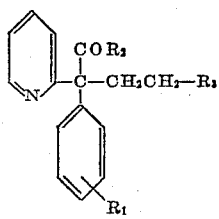

wherein $R_1$ is a member of the group consisting of H, halogen of atomic number not less than 17 and not more than 35 lower alkyl and lower alkoxy, $R_2$ and $R_3$ are members of the group consisting of lower dialkylamino, piperidino, morpholino and pyrrolidino.

2. α-(p-Chlorophenyl-α - (2 - pyridyl) - γ - dimethylaminobutyric acid dimethylamide.

3. α-(p-Chlorophenyl)-α - (2 - pyridyl) - γ - dimethylaminobutyric diethylamide.

4. N - [α - (p - bromophenyl) - α - (2 - pyridyl) - γ-dimethylaminobutyryl]-piperidine.

5. α - (p - Bromophenyl) - α - (2 - pyridyl) - γ - piperidinobutyric acid diethylamide.

6. N - (α - (p - chlorophenyl - α - (2 - pyridyl) - γ-piperidinobutyryl]-pyrrolidine.

7. In the process for producing compounds of the following formula:

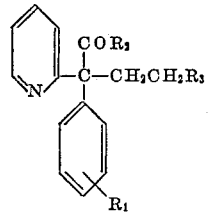

wherein $R_1$ is a member of the group consisting of H, Cl, Br, lower alkyl and lower alkoxy, and $R_2$ and $R_3$ are members of the group consisting of lower dialkylamino, piperidino, pyrrolidino and morpholino, the steps which comprise condensing a compound of the formula:

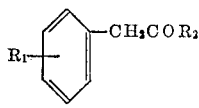

with a 2-halogeno-pyridine and a compound of the formula $R_3CH_2CH_2$-halide in the presence of a basic condensing agent.

8. Process according to claim 7 wherein the basic condensing agent is an alkali metal amide.

9. Process according to claim 7, including the step of hydrolyzing and decarboxylating the amide of the formula:

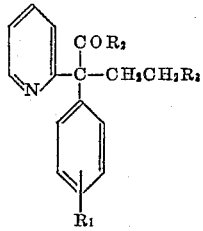

wherein $R_1$ is a member of the group consisting of H, Cl, Br, lower alkyl and lower alkoxy, and $R_2$ and $R_3$ are members of the group consisting of lower dialkylamino, pyrrolidino, piperidino and morpholino, and isolating the propylamine having the formula:

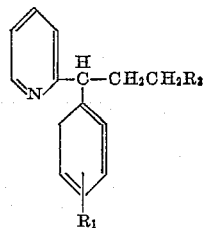

10. Process according to claim 9, wherein $R_1$ is a p-chloro-substituent and $R_3$ is a dimethylamino group.

11. Process according to claim 9, wherein $R_1$ is a p-bromo-substituent and $R_3$ is a dimethylamino group.

12. Process according to claim 9, wherein the condensation with a 2-halogeno pyridine and a compound of the formula $R_3CH_2CH_2$-halide is carried out in a single operation.

13. Compounds of the following formula:

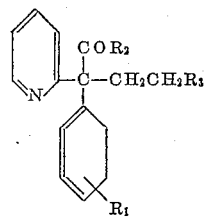

wherein $R_1$ is a halogen of atomic number not less than 17 and not more than 35, and $R_2$ and $R_3$ are lower dialkylamino groups.

14. Compounds of the following formula:

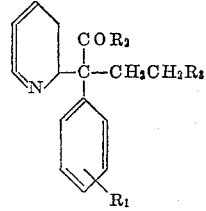

wherein $R_1$ is a halogen of atomic number not less than 17 and not more than 35, $R_2$ is a lower dialkylamino group and $R_3$ is piperidino.

15. Compounds of the following formula:

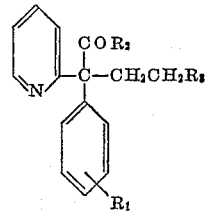

wherein $R_1$ is a halogen of atomic number not less than 17 and not more than 35, $R_2$ is a piperidino group and $R_3$ is a lower dialkylamino group.

References Cited in the file of this patent
UNITED STATES PATENTS
2,731,462    Ehrhart et al. _____ Jan. 17, 1956
FOREIGN PATENTS
731,560    Germany _____ Jan. 14, 1943
OTHER REFERENCES
Cheney et al.: Chem. Abstracts, vol. 47, cols. 1648–9 (1953).